(12) United States Patent
Lavasser et al.

(10) Patent No.: US 6,987,338 B1
(45) Date of Patent: Jan. 17, 2006

(54) GROUND STRAP FOR A MOTOR HAVING A PLASTIC HOUSING

(76) Inventors: Leonard J. Lavasser, 387 Carlton Rd., Bristol, TN (US) 37620; Dennis J. Mancl, 284 Essex Dr., Bluff City, TN (US) 37618

( * ) Notice: Subject to any disclaimer, the term of this patent is extended or adjusted under 35 U.S.C. 154(b) by 67 days.

(21) Appl. No.: 10/747,765

(22) Filed: Dec. 29, 2003

(51) Int. Cl.
*A47L 9/28* (2006.01)

(52) U.S. Cl. .................. 310/71; 310/68 R; 310/89; 310/90; 310/43; 15/412

(58) Field of Classification Search .............. 310/71, 310/68 R, 90
See application file for complete search history.

(56) References Cited

U.S. PATENT DOCUMENTS

| | | | |
|---|---|---|---|
| 2,905,267 A | 9/1959 | Thompson | |
| 3,159,354 A * | 12/1964 | Yartz et al. | 241/46.08 |
| 3,626,225 A | 12/1971 | Pauwels | |
| 3,875,462 A * | 4/1975 | Kiefer et al. | 241/36 |
| 4,315,343 A | 2/1982 | Neroda et al. | |
| 4,429,204 A | 1/1984 | McGuire et al. | |
| 4,513,214 A | 4/1985 | Dieringer | |
| 4,621,991 A | 11/1986 | Smith et al. | |
| 4,698,534 A | 10/1987 | Smith et al. | |
| 4,798,984 A * | 1/1989 | Suzuki et al. | 310/68 C |
| 5,313,129 A | 5/1994 | Stewart | |
| 6,158,083 A | 12/2000 | Holsten | |

* cited by examiner

*Primary Examiner*—Darren Schuberg
*Assistant Examiner*—Erik Preston
(74) *Attorney, Agent, or Firm*—Robert J. Harter

(57) ABSTRACT

For a motor having a plastic bracket, a single-piece ground strap grounds both the motor's stator and rotor. The ground strap has one end fastened to a bearing retainer of the motor, an opposite end connected to a ground wire, and an intermediate section that is compressed between the stator and the housing. The end connected to the bearing retainer grounds the rotor, and the intermediate section grounds the stator. The ground strap is fastened to the motor using fasteners that already exist in an otherwise identical but ungrounded motor. In some cases, a combination bearing retainer and ground strap is blanked and formed as a unitary piece.

3 Claims, 4 Drawing Sheets

GROUND STRAP FOR A MOTOR HAVING A PLASTIC HOUSING

BACKGROUND OF THE INVENTION

1. Field of the Invention

The subject invention generally pertains to electric motors with plastic housings and more specifically to ground strap for such a motor.

2. Description of Related Art

Motors, particularly for residential or commercial appliances such as vacuum cleaners, carpet cleaners, etc. are preferably grounded to prevent electrical shock to the user should a short circuit occur in the motor. For greatest protection, it is best to ground both the stator and the rotor (armature) of the motor. This is readily accomplished when the stator and rotor are supported by a housing or bracket made of cast aluminum or other electrically conductive material. In such cases, a ground wire is simply attached somewhere to the housing. Cast aluminum housings, unfortunately, are often more expensive and heavier than plastic ones, so some effort has been made to ground motors that have plastic housings.

U.S. Pat. Nos. 4,698,534 and 4,621,991, for example, disclose a motor supported by a plastic bracket wherein the rotor is grounded by a disk/clip assembly that is pinched or simply jammed between the plastic bracket and the rotor's bearing. Although assembling such a connection may be quick and easy, motor vibration and fatigue may eventually diminish electrical continuity between the clip and the bearing. Nonetheless the design offers the advantage of being able to have the clip extend to where it can be crushed or clamped between the stator and the plastic bracket thereby grounding the stator as well.

U.S. Pat. No. 5,313,129 discloses a means for grounding a rotor by connecting a ground wire to the rotor's bearing. Although the rotor appears to be grounded, it is not clear whether the stator is grounded. It appears that grounding the stator would require additional structure.

For motors whose housing or bracket is made of plastic, the stator can be grounded by welding a ground lug or wire directly to the side of the stator. Although effective, such a method requires additional equipment and labor.

Consequently, there is a need for an easy, inexpensive way to ground both the rotor and the stator of a motor that has a plastic housing and do so with a minimal number of parts.

SUMMARY OF THE INVENTION

It is an object of the invention to ground both the rotor and the stator of a motor having a plastic housing/bracket.

Another object of some embodiments is to fasten a ground strap using existing fasteners of the motor, whereby the fasteners serve multiple purposes.

Another object of some embodiments is to render a motor groundable by adding a single part to an otherwise fully functional but ungrounded motor.

Another object of some embodiments is to use a stator tie rod to help clamp a ground strap in place.

Another object of some embodiments is to use a bearing retainer fastener to help anchor a ground strap.

Another object of some embodiments is to configure a ground strap with two generally parallel sections for electrically coupling a rotor bearing to an axial end of a stator, wherein the rotor bearing and the end of the stator are axially offset and parallel to each other.

Another object of some embodiments is to minimize the cost and part-count of a grounded motor whose housing is made of plastic.

Another object of some embodiments is to provide a very solid connection between a ground strap and a stator and the ground strap and a rotor.

Another object of some embodiments is to provide a ground strap with a crushable feature that ensures a positive electrical connection between the ground strap and a stator.

Another object of some embodiments is to provide a safe, lightweight air-moving appliance by providing the appliance with a grounded motor whose housing is made of plastic.

Another object of some embodiments is to provide a plastic motor housing with a slot for receiving the ground strap so that the slot helps align a hole in the strap with a tie rod that fastens the strap to the housing.

Another object of some embodiments is to provide a plastic motor housing with a slot for receiving the ground strap, wherein the slot has a depth that ensures proper compression of the ground strap yet allows the stator to squarely engage the motor housing.

Another object of some embodiments is to provide a single-piece combination ground strap and bearing retainer.

Another object of some embodiments is to have a motor bracket, an air guide, a bearing retainer, and a ground strap share a common fastener.

One or more of these and/or other objects of the invention are provided by a motor that comprises a stator, a rotor, and a plastic housing. To ground the rotor and the stator, a single ground strap has one end fastened to a bearing retainer of the motor, an opposite end made available for connection to a suitable ground wire, and a intermediate section that is compressed between the stator and the housing.

DESCRIPTION OF THE PREFERRED EMBODIMENT

Figure 1:
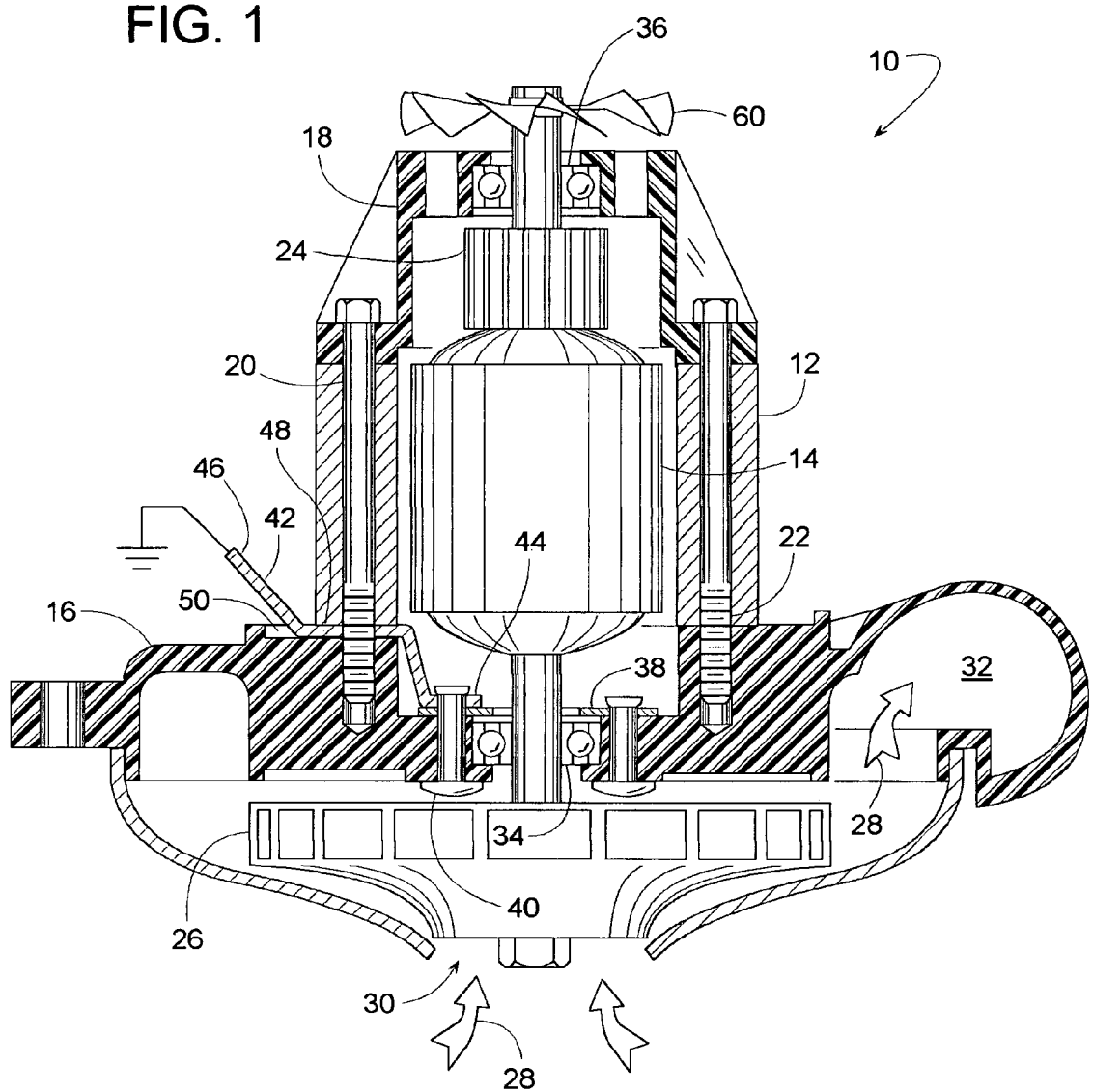
FIG. 1 is a cross-sectional view of a motor that includes a ground strap according to one embodiment of the invention.
Figure 2:
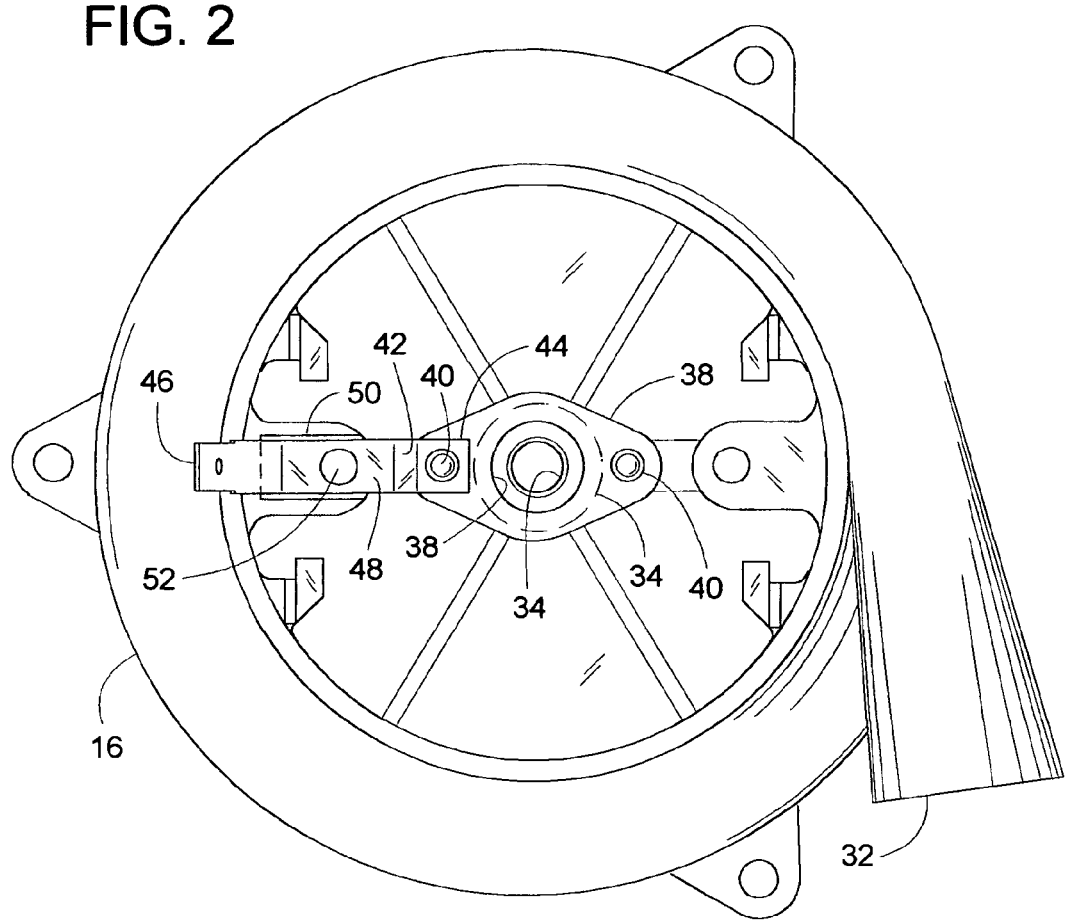
FIG. 2 is a top view of the motor of FIG. 1 but with the stator, rotor and other parts omitted to show a top view of the ground strap.

A motor 10, shown in FIGS. 1 and 2, comprises a stator 12, a rotor 14, a plastic housing 16, and a plastic bracket 18. Although housing 16 and bracket 18 can be made of a thermosetting polyester-based plastic, the use of other types of plastics is well within the scope of the invention. In some cases, housing 16 and bracket 18 are made of a T40 series compound provided by Rodgers Engineering of Addison, Ill. Two tie rods 20 are each threaded at one end 22 so that the tie rods can screw into housing 16 for clamping stator 12 between housing 16 and bracket 18. A commutator 24 on rotor 14 is engaged by a pair of brushes (not shown) to deliver electrical current to the rotor. In a currently preferred embodiment, motor 10 is for a portable vacuum cleaner or similar cleaning appliance where rotor 14 drives an impeller 26 that forces air 28 from a fan inlet 30 to a discharge outlet 32 of housing 16.

An inboard bearing 34 in housing 16 and an outboard bearing 36 in bracket 18 support rotor 14 within stator 12. An annular bearing retainer 38 made of sheet metal is attached to housing 16 by way of a bearing retainer fastener 40. Bearing retainer fastener 40 represents any fastener for holding bearing retainer 38 to housing 16. Examples of bearing retainer fastener 40 include, but is not limited to, a rivet, a screw and nut assembly, a self-tapping screw, etc.

Only a single piece is added to motor 10 to provide a groundable connection to both stator 12 and rotor 14. That single piece is a sheet metal ground strap 42 that includes an attachment end 44, a terminal end 46, and a central portion 48 therebetween. Attachment end 44 and central portion 48 are generally parallel to each other to accommodate the axial offset between bearing 38 and the lower edge of stator 12. The dimensions of terminal end 46 are 0.25-inches by 0.032-inches, which is an industry standard that allows a conventional ground wire connector to be attached to terminal end 46.

To ground rotor 14, fastener 40 connects attachment end 44 to bearing retainer 38, which in turn is in intimate contact with an outer race of inboard bearing 34, and bearing 34 is of course in direct contact with rotor 14. Ground strap 42, bearing retainer 38, bearing 34, and rotor 14 are made of metal (entirely or at least partially) to establish electrical continuity between ground strap 42 and rotor 14.

To ground stator 12, central portion 48 of ground strap 42 lies along a slot 50 in housing 16 just underneath stator 12. Tie rod 20 fits through a hole 52 in ground strap 42, and tightening tie rod 20 pinches or compressively clamps central portion 48 of ground strap 42 between stator 12 and the bottom of slot 50 of housing 16. Pressing the bottom surface of stator 12 down against central portion 48 establishes electrical continuity between stator 12 and ground strap 42.

Thus, tie rod 20 provides the dual purpose of connecting housing 16, bracket 18 and stator 12 together plus connecting stator 12 to ground strap 42. And rivet 40 provides the dual purpose of attaching bearing retainer 38 to housing 16 plus connecting ground strap 42 to bearing retainer 38.

Figure 3:
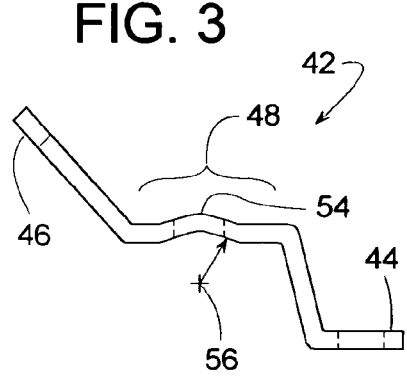
FIG. 3 is a side view of the ground strap used in the embodiment of FIG. 1.
Figure 4:
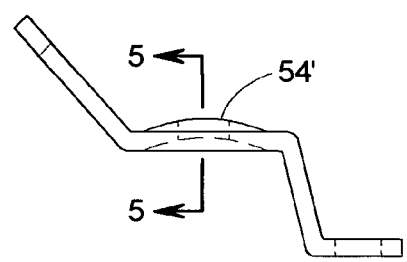
FIG. 4 is a side view similar to FIG. 3 but showing a variation of the ground strap.
Figure 5:
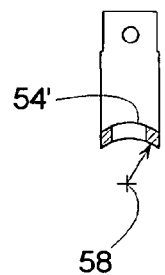
FIG. 5 is a cross-sectional view taken along line 5—5 of FIG. 4.

To ensure ground strap 42 is held in compression between stator 12 and housing 16, central portion 48 includes a crushable curved section 54 as shown in FIG. 3. So, even if the material thickness of ground strap 42 is less than the depth of slot 50, the curved raised section 54 will urge at least some of central portion 48 to protrude above slot 50, whereby the protruding part will be compressed between stator 12 and the bottom of slot 50. In some embodiments, the ground strap has a material thickness of 0.032" and slot 50 has a depth of 0.035". The actual shape of the curved raised section 54 can vary. In FIG. 3, for example, section 54 curves about an axis 56. And in FIGS. 4 and 5, section 54' curves about an axis 58 that lies at a right angle to axis 56. Numerous other protuberances and shapes will be apparent to those skilled in the art. It is best, however, to have the ground strap be resiliently compressible so that the resilience of strap 42 maintains some upward pressure against the bottom surface of stator 12.

As an alternative to the crushable curved section being on the ground strap, the crushable curved section could be one or more slight protrusions that extend upward from the bottom surface of slot 50. The protrusion, for example, could be 0.030-inches in diameter and 0.020-inches tall so that the protrusion is readily crushable as the tie rod clamps the stator between the motor's bracket and housing. The protrusion could be injection molded along with the rest of the motor housing, so the central portion of the ground strap could be flat.

Regardless of the crushable curved section's location, slot 50 also helps align the ground strap's hole 52 for the insertion of tie rod 20 during assembly.

Figure 6:
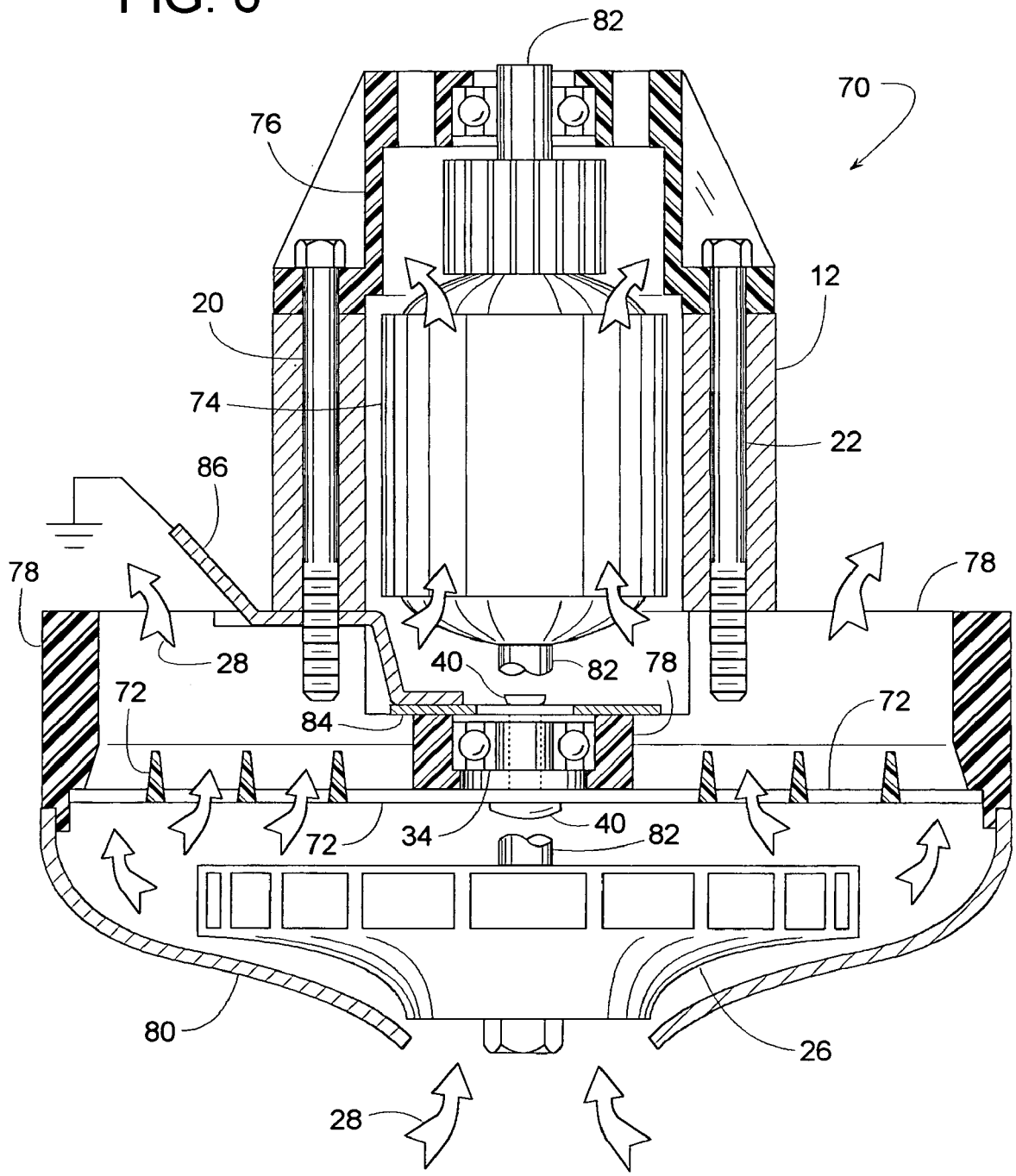
FIG. 6 is a cross-sectional view of a motor that includes an airguide, wherein portions of the bearing bracket are not illustrated so that the airflow pattern through the motor can be seen more clearly.

In some cases, motor 10 includes a cooling fan 60 that helps cool motor 10. In other cases, as shown in FIG. 6, a motor 70 is cooled by having an airguide 72 direct a portion of air 28 across the motor's stator 12 and rotor 74. Motor 70 also includes a plastic bracket 76, a plastic housing 78, a suction bell 80, impeller 26, a rotor shaft 82 that couples rotor 74 to impeller 26, inboard bearing 34, and tie rods 20 and 22. Tie rods 20 and 22 extend through bracket 76 and screw into a boss (not shown) of housing 78 to clamp stator 12 between bracket 76 and housing 78. To more clearly show fastener 40 and other features of motor 70, a section of the rotor's shaft 82 has been cutaway. Fastener 40 attaches a bearing retainer 84, a ground strap 86 and airguide 72 to housing 78.

Figure 7:
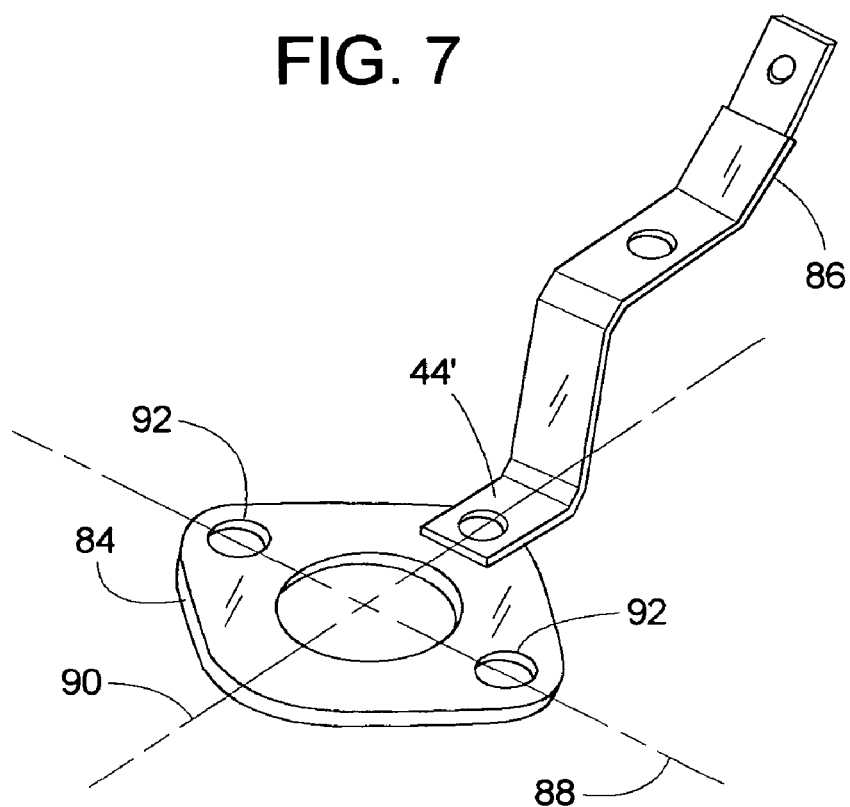
FIG. 7 is a perspective view of a ground strap that is spot-welded to a bearing retainer.

In this example, fasteners 40 lie along a line 88 that is perpendicular to another line 90 along which tie rods 20 and 22 lie. This can be achieved, as shown in FIG. 7, by having an attachment end 44' of ground strap 86 spot-welded or otherwise attached to a point that is midway between holes 92 through which fasteners 40 extend. When assembled, tie rod 20 extends through hole 92 in ground strap 86 to crushably clamp ground strap 86 between stator 12 and the boss borne by housing 78.

Figure 8:
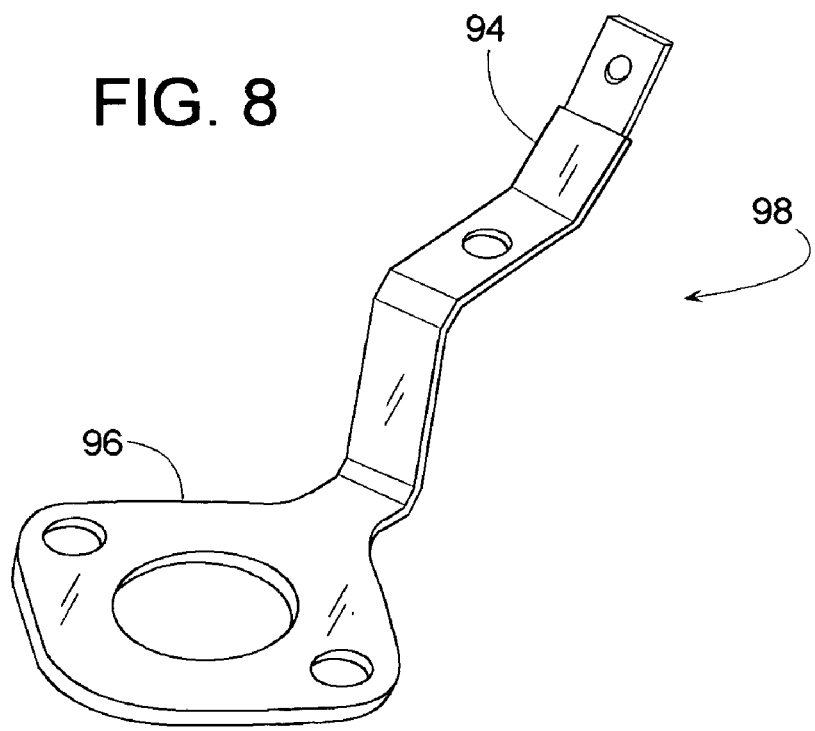
FIG. 8 is a perspective view of a combination bearing retainer and ground strap that is blanked and formed as a unitary piece.

Ground strap 86 and bearing retainer 84 as well as ground strap 42 and bearing retainer 38 can be blanked and formed from a single piece of sheet metal. FIG. 8, for example, shows a ground strap 94 being an integral extension of a bearing retainer 96, whereby the combination of ground strap 94 and bearing retainer 96 is a unitary piece 98. The unitary design ensures electrical continuity between the bearing retainer and the ground strap by eliminating potential problems caused by oxidation, vibration or fatigue.

Although the invention is described with reference to a preferred embodiment, it should be appreciated by those skilled in the art that various modifications are well within the scope of the invention. Therefore, the scope of the invention is to be determined by reference to the following claims.

What is claimed is:

1. A motor, comprising:
 a plastic housing;
 an inboard bearing supported by the plastic housing;
 a plastic bracket;
 an outboard bearing supported by the plastic bracket;
 a stator interposed between the plastic housing and the plastic bracket;
 a rotor supported by the inboard bearing and the outboard bearing;
 a metal bearing retainer engaging the inboard bearing such that electrical continuity is established between the rotor and the metal bearing retainer;

a bearing retainer fastener that fastens the metal bearing retainer to the plastic housing such that the metal bearing retainer holds the inboard bearing to the plastic housing;

a metal ground strap having an attachment end, a terminal end, and a central portion therebetween, wherein the bearing retainer fastener attaches the attachment end to the metal bearing retainer to establish electrical continuity between the rotor and the metal ground strap, and the central portion of the metal ground strap extends between the stator and the plastic housing; and a tie rod that clamps the stator between the plastic housing and the plastic bracket such that the central portion of the ground strap is held in compression between the stator and the plastic housing, whereby the terminal end of the metal ground strap provides a groundable connection to the stator and the rotor, wherein the attachment end and the central portion of the metal ground strap are substantially parallel to each other.

2. A motor, comprising;

a plastic housing;

an inboard bearing supported by the plastic housing;

a plastic bracket;

an outboard bearing supported by the plastic bracket;

a stator interposed between the plastic housing and the plastic bracket;

a rotor supported by the inboard bearing and the outboard bearing;

a metal bearing retainer engaging the inboard bearing such that electrical continuity is established between the rotor and the metal bearing retainer;

a bearing retainer fastener that fastens the metal bearing retainer to the plastic housing such that the metal bearing retainer holds the inboard bearing to the plastic housing;

a metal ground strap having an attachment end, a terminal end, and a central portion therebetween, wherein the bearing retainer fastener attaches the attachment end to the metal bearing retainer to establish electrical continuity between the rotor and the metal ground strap, and the central portion of the metal ground strap extends between the stator and the plastic housing;

a crushable curved section borne by at least one of the plastic housing and the central portion of the metal ground strap; and a tie rod that clamps the stator between the plastic housing and the plastic bracket, wherein the tie rod extends through the central portion of the ground strap such that the crushable curved section is held in compression between the stator and the plastic housing, whereby the terminal end of the metal ground strap provides a groundable connection to the stator and the rotor, wherein the attachment end and the central portion of the metal ground strap are substantially parallel to each other.

3. A motor, comprising:

a plastic housing;

an inboard bearing supported by the plastic housing;

a plastic bracket;

an outboard bearing supported by the plastic bracket;

a stator interposed between the plastic housing and the plastic bracket, wherein the plastic housing and the stator define a slot therebetween;

a rotor supported by the inboard bearing and the outboard bearing;

an impeller attached to the rotor for moving air, wherein the plastic housing defines a discharge outlet for the impeller;

a metal bearing retainer engaging the inboard bearing such that electrical continuity is established between the rotor and the metal bearing retainer;

a bearing retainer fastener that fastens the metal bearing retainer to the plastic housing such that the metal bearing retainer holds the inboard bearing to the plastic housing;

a metal ground strap being an integral extension of the metal bearing retainer, whereby the metal ground strap and the metal bearing retainer are a unitary piece to maintain electrical continuity therebetween;

a tie rod that clamps the stator between the plastic housing and the plastic bracket such that a portion of the metal ground strap is held in compression between the stator and the plastic housing, whereby the metal ground strap provides a groundable connection to the stator and the rotor; and an airguide that directs the air from the impeller to the plastic housing, wherein the bearing retainer fastener further fastens the airguide to the plastic housing.

* * * * *